(12) United States Patent
Steinlechner et al.

(10) Patent No.: US 7,751,997 B2
(45) Date of Patent: Jul. 6, 2010

(54) HIGHLY FAULT-TOLERANT METHOD FOR EVALUATING PHASE SIGNALS

(75) Inventors: Siegbert Steinlechner, Leonberg (DE); Axel Wenzler, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 11/721,920

(22) PCT Filed: Jun. 8, 2006

(86) PCT No.: PCT/EP2006/062998

§ 371 (c)(1),
(2), (4) Date: Jun. 15, 2007

(87) PCT Pub. No.: WO2007/009842

PCT Pub. Date: Jan. 25, 2007

(65) Prior Publication Data

US 2009/0254303 A1    Oct. 8, 2009

(30) Foreign Application Priority Data

Jul. 18, 2005    (DE) .................. 10 2005 033 402

(51) Int. Cl.
G06F 19/00 (2006.01)
G01P 3/00 (2006.01)
(52) U.S. Cl. .................................. 702/72; 702/147
(58) Field of Classification Search ............ 702/72, 702/147; 73/579, 594
See application file for complete search history.

(56) References Cited

U.S. PATENT DOCUMENTS 5,930,905 A    8/1999    Zabler et al.

(Continued)

FOREIGN PATENT DOCUMENTS

DE    195 06 938    8/1996

(Continued)

Primary Examiner—Bryan Bui
(74) Attorney, Agent, or Firm—Michael J. Striker

(57) ABSTRACT

The invention relates to a method for unambiguously determining a physical parameter $\Phi$ using m phase-measured values $\alpha_i$ with $1 \leq i \leq m$, whereby the phase-measured values $\alpha_i$ have different, integer periodicity values $n_i$ and an integer periodicity difference (a) with $\Delta n > 1$ within an unambiguous range E of the physical parameter $\Phi$. A value T with (b) and (c) is calculated based on the phase-measured values $\alpha_i$ and the periodicity values $n_i$ thereof, and, within a reduced unambiguous range $E_{red}$ with (d), a value V is allocated to the value T by allocation according to (e), wherein $T_{Uk}$ stands for a respective lower limit and $T_{Ok}$ for a respective upper limit of T. The allocation intervals between the upper ($T_{Ok}$) and the lower limits ($T_{Uk}$) for T, as wells as the distances (f) correspond at least to the periodicity difference $\Delta n$. In order to determine the physical parameter $\Phi$, value V is added up with the phase-measured values $\alpha_i$ in a weighted manner.

$$\Delta n = |n_i - n_{i-1}| \qquad (a)$$

$$T = T(\alpha_j, n_i) \qquad (b)$$

$$j, l \in Z\{1, \ldots, i\} \qquad (c)$$

$$E_{red} = \frac{1}{\Delta n} \cdot E \qquad (d)$$

$$V = V(T) = \begin{cases} V_1 f \ddot{u}r\, T \geq T_{O1} \\ V_2 f \ddot{u}r\, T_{U2} \leq T < T_{O2} \\ V_3 f \ddot{u}r\, T_{U3} \leq T < T_{O3} \\ \ldots \\ V_k f \ddot{u}r\, T < T_{Uk} \end{cases} \qquad (e)$$

$$\Delta V = |V_{k+1} - V_k| \qquad (f)$$

8 Claims, 3 Drawing Sheets

U.S. PATENT DOCUMENTS

| | | | |
|---|---|---|---|
| 6,816,108 B2 | 11/2004 | Steinlechner et al. | |
| 6,820,030 B2 | 11/2004 | Steinlechner et al. | |
| 7,107,159 B2 * | 9/2006 | German | 702/41 |
| 7,387,027 B2 * | 6/2008 | Choi et al. | 73/668 |

FOREIGN PATENT DOCUMENTS

| | | |
|---|---|---|
| DE | 101 42 449 | 3/2002 |
| DE | 102 47 321 | 2/2004 |
| WO | 03/004974 | 1/2003 |

* cited by examiner

HIGHLY FAULT-TOLERANT METHOD FOR EVALUATING PHASE SIGNALS

CROSS-REFERENCE TO A RELATED APPLICATION

The invention described and claimed hereinbelow is also described in German Patent Application DE 102005033402.4 filed on Jul. 18, 2005. This German Patent Application, whose subject matter is incorporated here by reference, provides the basis for a claim of priority of invention under 35 U.S.C. 119(a)-(d).

BACKGROUND OF THE INVENTION

The present invention relates to a method for determining a physical parameter $\Phi$, and circuit design for carrying out the method.

RELATED ART

With some technical measurement tasks, two or more phase-measured values are obtained, which are used to determine the physical parameter to be measured, e.g., an angle or a distance. These phase signals pass through several periods over an unambiguous range E of the parameter to be measured, i.e., they are also ambiguous within the unambiguous range E of the parameter to be measured. The number of periods of phase signal $\alpha_i$ in unambiguous range E is referred to as periodicity value $n_i$; index i extends from 1 to m, with m representing the number of phase signals. The mathematical relationship between phase signals $\alpha_i$ and unambiguous measured value $\Phi$, e.g., an angle or a distance, can therefore be defined as follows:

$$\alpha_i = \operatorname*{mod}_1(n_i \cdot \Phi), \quad (\mathrm{I})$$
$$i = 1, \ldots, m$$

In equation (I), all signals are normalized such that they extend across a value range of 0 to 1. In FIG. 2, phase signals $\alpha_1$ and $\alpha_2$ are shown over unambiguous range E for $\Phi = 0, \ldots, 1$. In the example depicted in FIG. 2, the periodicity values are chosen as $n_1 = 7$ and $n_2 = 9$.

With some applications, the periodicity values can be chosen in the design phase of the system. In other applications, the periodicity values are predefined. This can be the case with interferometry, e.g., when the wavelengths and/or wavelength relationships are defined by basic physical conditions.

Examples of technical systems with phase signals include:

Distance measurement using RADAR or modulated laser light. A total of m measurements are carried out at various frequencies $f_1, \ldots, f_m$. The signals reflected by an object at distance x have the following phase-measured values at the receiver location:

$$\alpha_i = \frac{2 \cdot \pi \cdot f_i \cdot 2 \cdot x}{c}$$

where c=the speed of light. The desired distance x is determined by solving the linear system of equations for x. The phase-measured values are therefore proportional to the parameter to be measured and the frequency used. The actual phase-measured values are always within the range of 0 to $2\pi$, however, so they are always only determined in terms of integer multiples of $2\pi$. In a normalized depiction, the phase-measured values are always located in the range of 0 to 1, and they are limited to integer multiples of 1.

Unambiguous angle measurement at a shaft over several revolutions. The shaft drives two rotating elements, e.g., using gears (see FIG. 2). Angular-position sensors are mounted on these rotating elements. The angular position values measured by these sensors are phase signals $\alpha_1$ and $\alpha_2$. By making a suitable choice for the number of teeth, it is possible to unambiguously determine angle $\Phi$ of the shaft over several revolutions using this system. The number of teeth is chosen such that the number of periods of phase signals passed through across the unambiguous range differs by exactly 1. A system of this type and a method for determining angle $\Phi$ of the shaft is made known in DE 195 06 938 A1.

Similar evaluation methods that are known as modified vernier methods are made known in DE 101 42 449 A1 and WO 03/004974 A1.

In those cases, the desired physical parameter is calculated by evaluating the phase-measured values from the phase signals. The calculation must be as accurate as possible. At the same time, measurement errors in the phase signals should not immediately cause the evaluation method to fail.

The known evaluation methods have one thing in common, namely that they tolerate faults in the input signals up to a bound that depends on the particular design. If the faults exceed this bound, large errors in the output signal can occur. The result is that the evaluation methods no longer function correctly.

SUMMARY OF THE INVENTION

The disadvantages of the related art are avoided with an inventive method of the species named initially by the fact that the periodicity values $n_i$ have an integer periodicity difference $$\Delta n = |n_i - n_{i-1}|$$

with $\Delta n > 1$; within a reduced unambiguous range $E_{red}$, with $$E_{red} \approx \frac{1}{\Delta n} \cdot E$$

value V is assigned to value T based on $$V = V(T) = \begin{cases} V_1 & \text{for } T \geq T_{O1} \\ V_2 & \text{for } T_{U2} \leq T < T_{O2} \\ V_3 & \text{for } T_{U3} \leq T < T_{O3} \\ \ldots \\ V_k & \text{for } T < T_{Uk} \end{cases}$$

in which $T_{Uk}$ stands for a particular lower limit, and $T_{Ok}$ stands for a particular upper limit of T, and the assignment intervals $$\Delta T = |T_{Ok} - T_{Uk}|$$

between the upper and lower limits for T, and the distances $$\Delta V = |V_{k+1} - V_k|$$

between adjacent values $V_k$—which are assigned to different values T separated by $\Delta T$—correspond to periodicity difference $\Delta n$ at the least. As a result, by performing the assignment within the reduced unambiguous range $E_{red}$, a fault tolerance for phase-measured values $\alpha_i$ that is multiplied by at least the factor Δn is attained, as compared with performing the assignment within the unambiguous range E, in order to determine physical parameter Φ. The following apply for the indices k of the upper and lower limits for T:

$$k \in \{1, \ldots, i\} \in \mathbb{N}.$$

The basic point of the present invention is to be able to use the phase evaluation known as the modified vernier method to unambiguously determine a physical parameter Φ even with systems that have considerable faults in the input signals.

If the periodicity values are established by the system or the basic physical conditions, the present invention results in a more robust evaluation than with the known methods. The reduction in unambiguous range E associated therewith to a reduced unambiguous range $E_{red}$ can often be tolerated.

The inventive method has the advantage that its robustness is multifold greater than that of evaluation methods known in the related art. The increase in the robustness of the evaluation method is attained essentially at the expense of unambiguous range E, which is decreased in size to reduced unambiguous range $E_{red}$. In reduced unambiguous range $E_{red}$, however, much greater limits can be chosen for the assignment of $V=V(T)$ $T_{Uk}$ and $T_{Ok}$, thereby increasing the fault tolerance for phase-measured values $\alpha_i$. These limits are typically greater than periodicity difference Δn of periodicity values $n_i$. In this case, "robustness" refers to the tolerance to faults in the phase signals. It is that much greater, the greater the faults in the phase signals are allowed to be, while the evaluation functions correctly.

The present invention also relates to a circuit design for evaluating phase signals as described, which requires only a small outlay for hardware and/or software.

DESCRIPTION OF THE PREFERRED EMBODINENTS

The description of the method applies to systems with two phase signals $\alpha_1$ and $\alpha_2$. It is also possible, in principle, to apply the method to systems with several phase signals $\alpha_i$, with $1 \leq i \leq m$, that is, with m dimensions.

As a prerequisite for the use of the inventive method, there must be an integer periodicity difference $\Delta n = |n_2 - n_1|$ greater than one. That is, the following applies:

$$\Delta n = 2, 3, 4, 5, \ldots \tag{II}$$

When normalized, the reduced unambiguous range is approximately 1/Δn. In the case of two-wavelength interferometry with wavelengths $\lambda_1$ and $\lambda_2$, this reduced unambiguous essentially corresponds to "synthetic wavelength" Λ, with $$\Lambda = \frac{\lambda_1 \lambda_2}{|\lambda_1 - \lambda_2|}.$$

Figure 1:
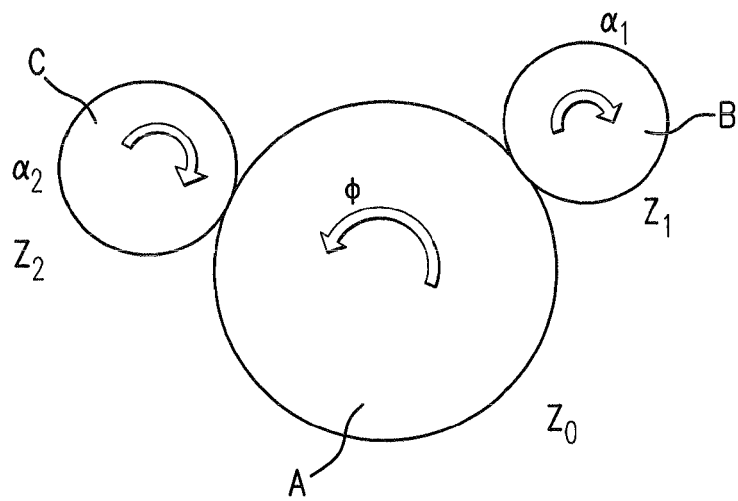
FIG. 1 a schematic depiction of a system for the unambiguous measurement of the angle of rotation Φ of a shaft by measuring phase signals $\alpha_1$, $\alpha_2$ at the gears driven by the shaft, FIG. 2 a depiction of the periodic course of phase signals $\alpha_1$, $\alpha_2$, with periodicity values $n_1$, $n_2$, over angle of rotation Φ of the shaft, FIG. 3 a circuit diagram of a system for signal evaluation, according to the related art, FIG. 4 a depiction of the course of parameter T defined via the phase signals and their periodicity value in FIG. 2, FIG. 5 a circuit design for carrying out the inventive method, with which the angle of rotation Φ is permitted to exceed unambiguous range $E_{red}$, FIG. 6 a detailed view of a circuit design for carrying out the inventive, modified rounding in FIG. 5, and FIG. 7 a circuit diagram of a further circuit design for carrying out the method according to the present invention.
Figure 2:
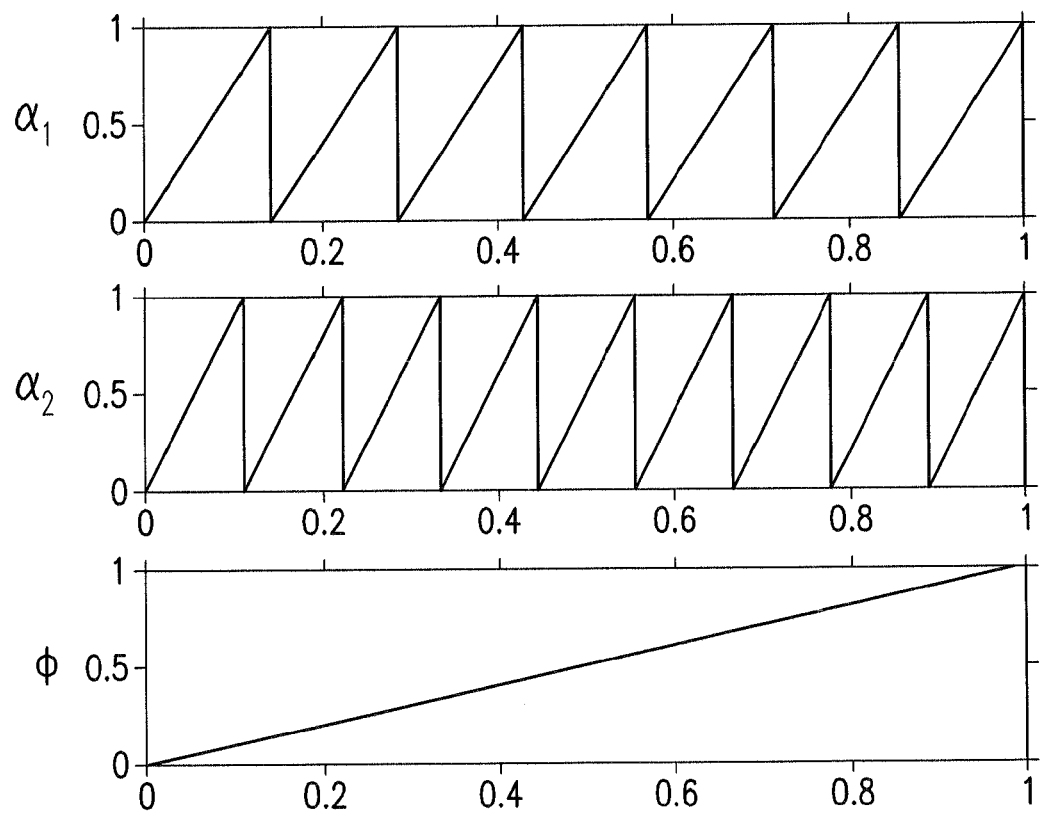

The method is explained with reference to a system with gears as shown in FIG. 1. The number of teeth $Z_0$, $Z_1$ and $Z_2$ of gears A, B, C are chosen such that periodicities $n_1=7$ and $n_2=9$ result for phase-measured values $\alpha_1$, $\alpha_2$. Unambiguous range E of rotational angles Φ then typically extends over several revolutions of the shaft on which gear A is mounted.

Figure 3:
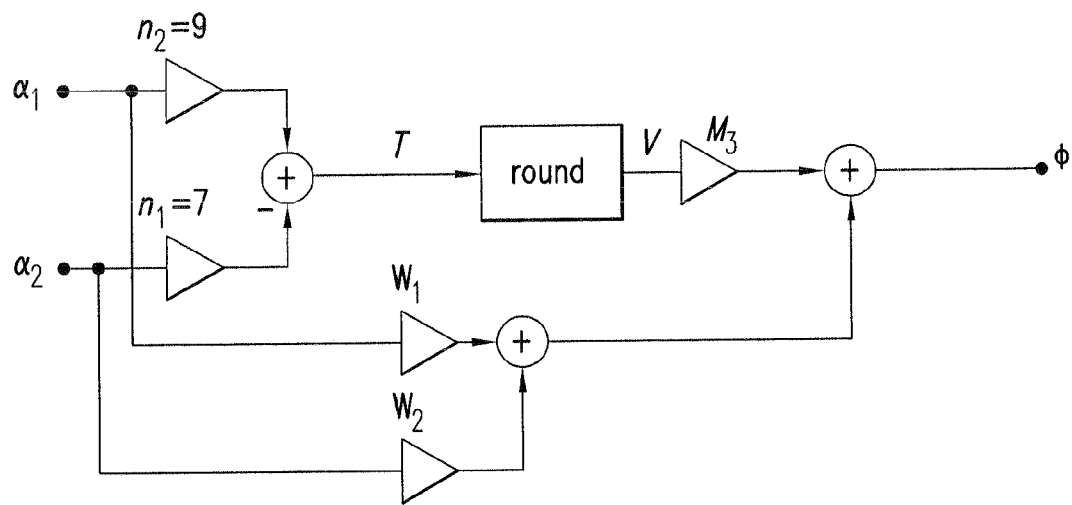

FIG. 3 shows a typical design for signal evaluation using the known method described in the related art. Based on phase-measured values $\alpha_1$ and $\alpha_2$, a parameter T defined as $$T = \alpha_1 \cdot n_2 - \alpha_2 \cdot n_1 \tag{III}$$

is formed. In the ideal case, i.e., when $\alpha_1$ and $\alpha_2$ contain no faults, this parameter T must be a whole number, due to theoretical considerations. In reality, the value of T is generally not a whole number. Therefore, using a rounding operation $$V = \text{round}(T) \tag{IV}$$

it is depicted as a integer value V. The rounding operation in equation (IV) delivers the desired result, provided faults $e_1$ and $e_2$ in phase-measured values $\alpha_1$ and $\alpha_2$ are less than bound $e_{max}$. The following applies for $e_{max}$:

$$e_{max} = \frac{180°}{n_1 + n_2} \tag{V}$$

If the faults become greater, it is no longer ensured that integer number V is correctly assigned to value T according to equation (IV).

Figure 4:
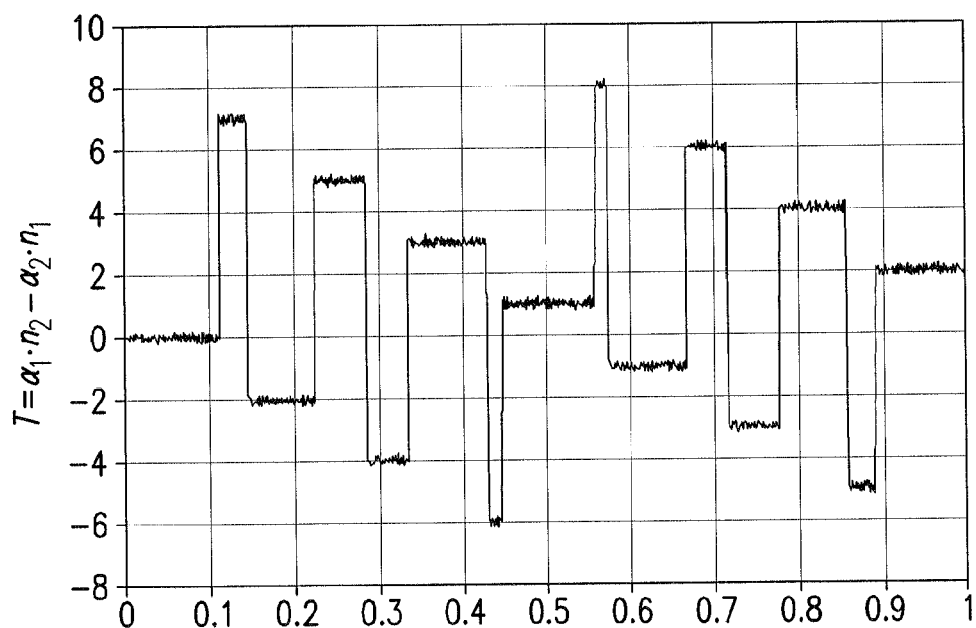

FIG. 4 shows the course of parameter T according to equation (III) over angle Φ for the example $n_1=7$, $n_2=9$ and Δn=2.

Considering a window of Φ=0, ..., 0.444, one sees that V is only defined by values −6, −4, −2, 0, 3, 5 and 7. The distance between these values is always ≧Δn. This property is utilized by the inventive method. If, for the periodicity value stated above, one remains within a reduced unambiguous range $E_{red}$ of $$E_{red} \approx \left\{ \Phi = 0, \ldots, \Phi = \frac{1}{2} \cdot \frac{n_2 - 1}{n_2} \right\}, \tag{VI}$$

an assignment can be used that corresponds to a modified rounding, which only permits the values stated above for V. This means, V is determined from T via the assignment $$V = V(T) = \begin{cases} 7 & \text{for } T \geq 6 \\ 5 & \text{for } 4 \leq T < 6 \\ 3 & \text{for } 1.5 \leq T < 4 \\ 0 & \text{for } -1 \leq T < 1.5 \\ -2 & \text{for } -3 \leq T < -1 \\ -4 & \text{for } -5 \leq T < -3 \\ -6 & \text{for } T < -5 \end{cases} \tag{VII}$$

It is now possible to ensure that entire value V is correctly assigned to value T when errors $e_1$ and $e_2$ in phase-measured values $\alpha_1$ and $\alpha_2$ do not exceed bound $$e_{max} = 2 \cdot \frac{180°}{n_1 + n_2} \quad \text{(VIII)}$$

This bound is higher than bound given in equation (V) by the factor $\Delta n=2$, with the result that the inventive method is more robust by the factor $\Delta n=2$.

A similar procedure can be formulated for $\Delta n=3, 4, \ldots$. The bound for permissible faults increases to $$e_{max} = \Delta n \cdot \frac{180°}{n_1 + n_2}, \quad \text{(IX)}$$

the unambiguous range reduces to approximately $$E_{red} \approx \frac{E}{\Delta n}.$$

It is important to note that reduced unambiguous range $E_{red}$, with $$E_{red} = \{\Phi | \Phi_{Ured} \leq \Phi \leq \Phi_{Ored}\},$$

with lower and upper limits $\Phi_{Ured}$ and $\Phi_{Ored}$ of reduced unambiguous range $E_{red}$, can form a window located anywhere within the unambiguous range $$E = \{\Phi | \Phi_U \leq \Phi \leq \Phi_O\},$$

with lower and upper limits $\Phi_U$ and $\Phi_O$ of unambiguous range E; the following applies for range $B_{Ered}$ of reduced unambiguous range $E_{red}$:

$$B_{E_{red}} = |\Phi_{Ored} - \Phi_{Ured}|$$

$$\approx \frac{B_E}{\Delta n}$$

$$= \frac{|\Phi_O - \Phi_U|}{\Delta n}$$

After V is assigned to T according to equation (VII), V is processed further to obtain desired angle of rotation $\Phi$. The next processing steps are to multiply V by a factor $M_3$, weight the phase-measured values, and sum $M_3 \cdot V$ with weighted phase-measured values $\alpha_1$ and $\alpha_2$:

$$\Phi = M_3 \cdot V + w_1 \cdot \alpha_1 + w_2 \cdot \alpha_2. \quad \text{(X)}$$

The following applies for weighting factors $w_i$:

$$1 = \sum_{i=1}^{m} w_i \cdot n_i$$

and $$w_i \approx \frac{1}{m \cdot n_i}$$

in which case the weighting factors are chosen such that they can be depicted entirely using the binary system used in the circuit design. The following preferably applies:

$$w_i = \frac{1}{m \cdot n_i}$$

From the result of equation (X), only the non-integer portion is used (modulo operation). In the example under consideration, the following factors can be chosen, e.g.:

$$M_3=0.4365 \quad w_1=\tfrac{1}{14} \quad w_2=\tfrac{1}{18}$$

A system for carrying out the inventive method described above is shown in FIG. 7. The assignment of V as V=V(T) is carried out using a system for modified rounding described in greater detail in FIG. 6.

In some cases, reduced unambiguous range $E_{red}$ is not adequate. The method described can then be expanded with consideration for the last angle value $\Phi_{alt}$: Input values $\alpha_1$ and $\alpha_2$ are modified such that they fall within reduced unambiguous range $E_{red}$. This shift is undone after the evaluation.

$\Phi_0$ is the midpoint of reduced unambiguous range $E_{red}$. The following applies:

$$\Phi_0 = \Phi_{Ured} + \frac{B_{E_{red}}}{2}.$$

Figure 5:
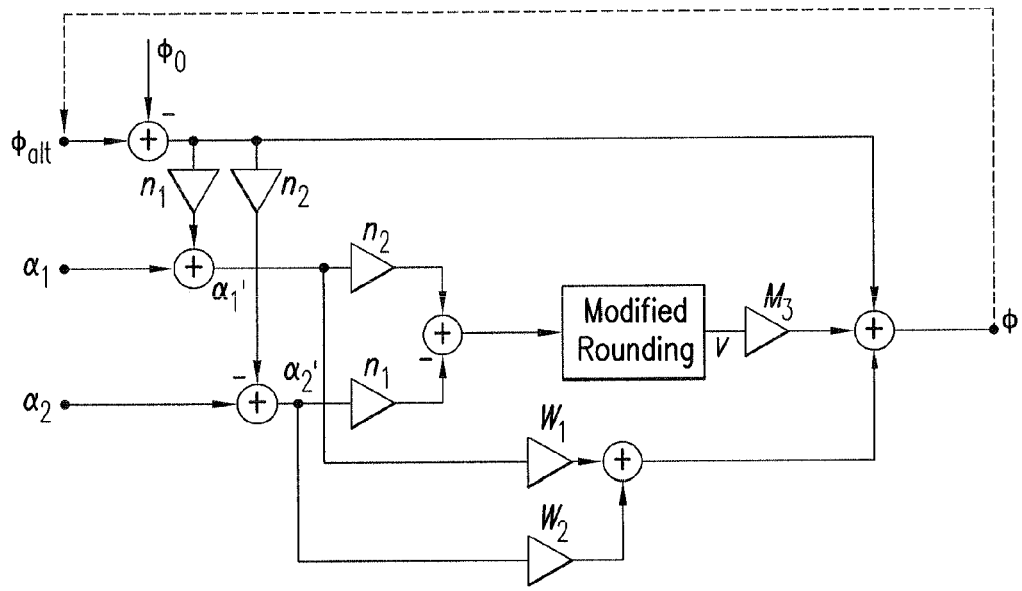

Using the depiction $$\alpha_1' = \alpha_1 - n_1 \cdot (\Phi_{alt} - \Phi_0)$$

$$\alpha_2' = \alpha_2 - n_2 \cdot (\Phi_{alt} - \Phi_0) \quad \text{(XI)}$$

the phase signals are modified such that they originate in the center $\Phi_0$ of the reduced unambiguous range. The signals are then evaluated as described above. This shift is then undone in the last step. FIG. 5 shows a system for realizing the method described, with depiction of the phase signals on reduced unambiguous range $E_{red}$. In this case as well, the assignment of V as V=V(T) is carried out using the system of modified rounding described in greater detail in FIG. 6.

This ensures that the phase-measures values $\alpha_i$ that are actually measured physically are always located in the reduced unambiguous range, thereby allowing the increased robustness of the inventive method to be utilized. As an alternative, it is also possible to adapt the assignment rule defined per equation (VII) to the last angle value.

It is important that the method not be integrating, even through the last angle value was incorporated. This means that potential faults in output signal $\Phi$ are not integrated.

Figure 6:
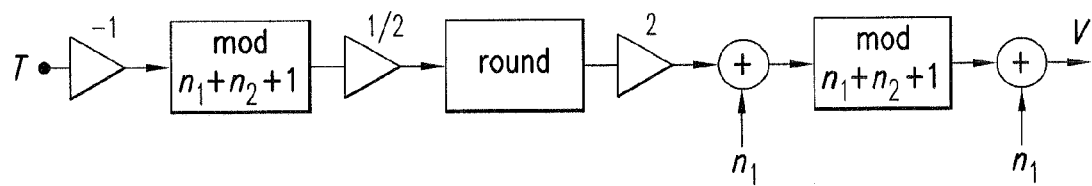
Figure 7:
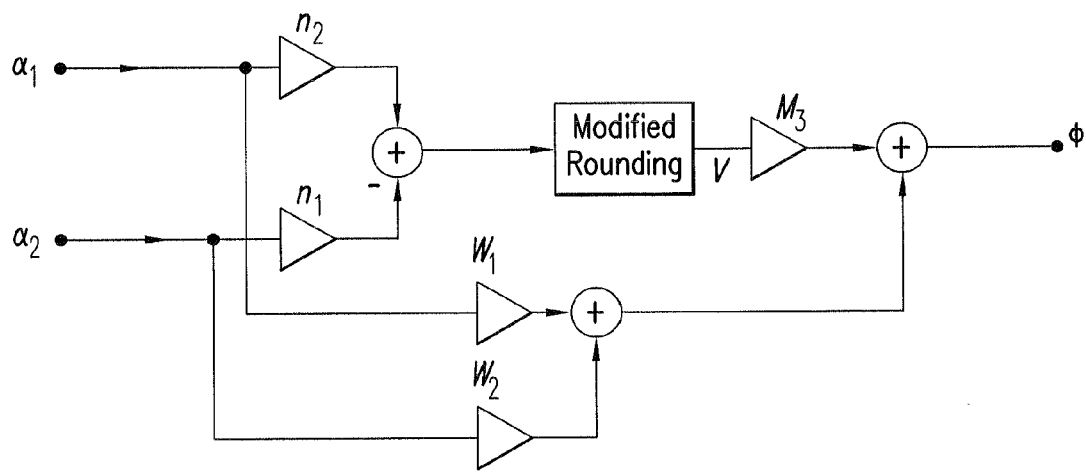

An effective design of the depiction of value T as V can take place using the system depicted in FIG. 6. If this system is used in the current example ($n_1=7$, $n_2=9$) with a reduced unambiguous range $$E_{red} = \{\Phi | 0 \leq \Phi \leq 0.444\}$$

it is advantageous to use the value 0.222 for $\Phi$.

Physical parameter $\Phi$ is not limited to an angle of rotation. Instead, it can be a distance or the like.

INDUSTRIAL APPLICABILITY

The prevent invention has industrial application, in particular, in tasks in which an exact and robust value for a physical parameter must be determined out of several phase signals, e.g., multifrequency distance measurement, measuring the angle of rotation, or the combined measurement of angular rotation and torque.

The invention claimed is:

1. A method for unambiguously determining an angular position measurement $\Phi$ of a revolving shaft, comprising the steps of using m phase-measured values $\alpha_i$, with $1 \leq i \leq m$, whereby the phase-measured values $\alpha_1$ have different, integer periodicity values $n_i$ within an unambiguous range E of the angular position measurement $\Phi$ of the revolving shaft;

based on the phase-measured values $\alpha_1$ and their periodicity values $n_i$, calculating positions T, whereby $$T=T(\alpha_j, n_l) \text{ and } j,l \in Z\{l, \ldots, i\};$$

assigning obtained distances V from a distance measurement device to positions T;

adding phase-measured values $\alpha_i$ in a weighted manner to distances V to determine the angular position measurement $\Phi$, wherein the periodicity values $n_i$ have an integer periodicity difference $$\Delta n = |n_j - n_{l-1}| \text{ and } j,l \in Z\{1, \ldots, m\}, \text{ with } j \neq l$$

with $\Delta n > 1$;

within a reduced unambiguous range $E_{red}$, with $$E_{red} \approx \frac{1}{\Delta n} \cdot E$$

assigning the distances V to the positions T using the following scheme:

$$V = V(T) = \begin{cases} V_1 & \text{for } T \geq T_{O1} \\ V_2 & \text{for } T_{U2} \leq T < T_{O2} \\ V_3 & \text{for } T_{U3} \leq T < T_{O3} \\ \ldots \\ V_k & \text{for } T < T_{Uk} \end{cases}$$

in which $T_{Uk}$ stands for the particular lower limit, and $T_{Ok}$ stands for the particular upper limit of positions T, and the assignment intervals $$\Delta T = |T_{Ok} - T_{Uk}|$$

between the upper limit ($T_{Ok}$) and the lower limit ($T_{Uk}$) for positions T, and the distances
$\Delta V = |V_{k+1} - V_k|$ correspond to at least one periodicity difference $\Delta n$.

2. The method as recited in claim 1, wherein the distances V=V(T) is a whole number ($V \in Z$) and, before being added with phase-measured values $\alpha_i$ to determine angular position measurement $\Phi$ of the revolving shaft, it is weighted by multiplying it by a weighing factor ($M_3$).

3. The method as recited in claim 1, wherein, before the phase-measured values $\alpha_i$ are added to determine angular position measurement $\Phi$ of the revolving shaft, they are weighted by multiplying them by their own weighing factors $w_i$, with $1 \leq i \leq m$.

4. The method as recited in claim 3, wherein, the weighting factors $w_i$ are preferably chosen as $$w_i = \frac{1}{m \cdot n_i}$$

with $$1 = \sum_{i=1}^{m} w_i \cdot n_i.$$

5. The method as recited in claim 1, wherein the reduced unambiguous range $E_{red}$, with $$E_{red} = \{\Phi | \Phi_{Ured} \leq \Phi \leq \Phi_{Ored}\},$$

forms a window located anywhere within the unambiguous range $E = \{\Phi | \Phi_U \leq \Phi \leq \Phi_O\}$, and the following applies for the range of the reduced unambiguous range:

$$B_{E_{red}} = |\Phi_{Ored} - \Phi_{Ured}|$$
$$\approx \frac{B_E}{\Delta n}$$
$$= \frac{|\Phi_O - \Phi_U|}{\Delta n}.$$

6. The method as recited in claim 1, wherein to determine a value of the angular position measurement $\Phi$ of the revolving shaft located outside of the reduced unambiguous range $E_{red}$, the last value $\Phi_{alt}$ located within the reduced unambiguous range $E_{red}$ is saved; a value $\Phi_0$ corresponding to the midpoint of the reduced unambiguous range $E_{red}$ is subtracted from this value $\Phi_{alt}$, and the difference $\Phi_{alt} - \Phi_0$ is used to modify the phase-measured values as follows:

$$\alpha_i' = \alpha_i - n_i \cdot (\Phi_{alt} - \Phi_0);$$

the modified phase-measured values $\alpha_i'$ therefore originate in the center of the reduced unambiguous range $E_{red}$; the value T is then calculated using the modified phase values $\alpha_i'$, and the distances V are assigned to the positions T using the following scheme:

$$V = V(T) = \begin{cases} V_1 & \text{for } T \geq T_{O1} \\ V_2 & \text{for } T_{U2} \leq T < T_{O2} \\ V_3 & \text{for } T_{U3} \leq T < T_{O3} \\ \ldots \\ V_k & \text{for } T < T_{Uk} \end{cases}$$

and the desired angular position measurement $\Phi$ of the revolving shaft is determined by summing the phase-measured values $a_{\alpha i}'$ with distances V and the difference $\Phi_{alt} - \Phi_0$, to obtain:

$$\Phi = M_3 \cdot V + (\Phi_{alt} - \Phi_0) + \sum_{i=1}^{m} w_i \cdot \alpha_i'.$$

7. The method as recited in claim 1, wherein, to determine the angular position measurement $\Phi$ of the revolving shaft, two phase-measured values $\alpha_1$ and $\alpha_2$ with periodicities $n_1 = 7$ and $n_2 = 9$ are identified in the unambiguous range E of angular position measurement $\Phi$;

a reduced unambiguous range $E_{red} = 0.444 \cdot E$ is considered, and positions T are calculated, as follows:

$$T = T(\alpha_j, n_i) = \alpha_1 \cdot n_2 - \alpha_2 \cdot n_1$$

in which case the following applies within the reduced unambiguous range $E_{red}$ $$V = V(T) = \begin{cases} 7 & \text{for } T \geq 6 \\ 5 & \text{for } 4 \leq T < 6 \\ 3 & \text{for } 1.5 \leq T < 4 \\ 0 & \text{for } -1 \leq T < 1.5 \\ -2 & \text{for } -3 \leq T < -1 \\ -4 & \text{for } -5 \leq T < -3 \\ -6 & \text{for } T < -5 \end{cases}$$

and the angular position measurement $\Phi$ of the revolving shaft is calculated, as follows:

$$\Phi = M_3 \cdot V + w_1 \cdot \alpha_1 + w_2 \cdot \alpha_2$$

with $M_3 = 0.4365$, $w_1 = \frac{1}{14}$ and $w_2 = \frac{1}{18}$.

8. A circuit design for carrying out a method claim 1, comprising means for identifying at least two phase-measured values $\alpha_i$ that differ by a periodicity difference $\Delta n$ greater than 1 and have integer periodicity values $n_i$ within an unambiguous range E of the angular position measurement $\Phi$ of the revolving shaft to be determined, means for calculating the positions T based on phase-measured values $\alpha_i$ and periodicity values $n_i$, means for assigning the distances to the calculated positions T according to the following scheme:

$$V = V(T) = \begin{cases} V_1 & \text{for } T \geq T_{O1} \\ V_2 & \text{for } T_{U2} \leq T < T_{O2} \\ V_3 & \text{for } T_{U3} \leq T < T_{O3} \\ \ldots \\ V_k & \text{for } T < T_{Uk} \end{cases}$$

in which $T_{Uk}$ stands for the particular lower limit, and $T_{Ok}$ stands for the particular upper limit of T, and the assignment intervals $\Delta T = |T_{Ok} - T_{Uk}|$ between the upper ($T_{Ok}$) limit and the lower limit ($T_{Uk}$) for positions T, and the distances $\Delta V = |V_{k+1} - V_k|$ correspond to the periodicity difference $\Delta n$ at the least, and means for adding the phase-measured values $\alpha_i$ and the distances V to determine the angular position measurement $\Phi$.

* * * * *